United States Patent
Yoshizawa (10) Patent No.: US 10,970,945 B2
(45) Date of Patent: Apr. 6, 2021

(54) CONTROL APPARATUS FOR VEHICLE AND CONTROL METHOD FOR VEHICLE

(71) Applicant: SUBARU CORPORATION, Tokyo (JP)

(72) Inventor: Satoshi Yoshizawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/743,430

(22) Filed: Jan. 15, 2020

(65) Prior Publication Data
US 2020/0312059 A1 Oct. 1, 2020

(30) Foreign Application Priority Data

Mar. 25, 2019 (JP) .............................. JP2019-056864

(51) Int. Cl.
*G07C 5/08* (2006.01)
*G08G 1/16* (2006.01)
*G01L 5/16* (2020.01)
*B60Q 9/00* (2006.01)

(52) U.S. Cl.
CPC ........... *G07C 5/0808* (2013.01); *B60Q 9/008* (2013.01); *G01L 5/16* (2013.01); *G07C 5/0833* (2013.01); *G08G 1/16* (2013.01)

(58) Field of Classification Search
CPC .... G07C 5/0808; G07C 5/0833; B60Q 9/008; G01L 5/16; G08G 1/16
USPC ........................................................ 340/438
See application file for complete search history.

(56) References Cited

U.S. PATENT DOCUMENTS

| | | | | |
|---|---|---|---|---|
| 6,092,014 A | * | 7/2000 | Okada | G01P 15/00 340/438 |
| 10,168,252 B1 | * | 1/2019 | Zeng | G07C 5/006 |
| 10,352,827 B2 | * | 7/2019 | Kato | G01M 17/02 |
| 2003/0144767 A1 | * | 7/2003 | Brachert | B60T 8/17551 701/1 |
| 2004/0249528 A1 | * | 12/2004 | Yanase | B60C 23/061 701/33.4 |
| 2005/0222740 A1 | | 10/2005 | Inoue et al. | |
| 2011/0125455 A1 | * | 5/2011 | Nardi | B60T 8/172 702/142 |

FOREIGN PATENT DOCUMENTS

| | | |
|---|---|---|
| JP | 4-331336 A | 11/1992 |
| JP | 10-318862 A | 12/1998 |
| JP | 2002-2472 A | 1/2002 |
| JP | 4277799 B2 | 3/2009 |

* cited by examiner

*Primary Examiner* — Kerri L McNally
(74) *Attorney, Agent, or Firm* — Troutman Pepper Hamilton Sanders LLP (57) ABSTRACT

A control apparatus for a vehicle includes tire-force sensors, a tire-force estimator, a turning-state detector, and a warning unit. The tire-force sensors are disposed on respective wheels of the vehicle. The tire-force estimator estimates tire forces of the respective wheels on the basis of sensor signals outputted from the respective tire-force sensors. The turning-state detector detects a turning state of the vehicle. The warning unit generates a warning in a mode that differs depending on the turning state when at least one of the wheels is estimated to be in a limit state on the basis of the estimated tire forces.

10 Claims, 4 Drawing Sheets

CONTROL APPARATUS FOR VEHICLE AND CONTROL METHOD FOR VEHICLE

CROSS-REFERENCE TO RELATED APPLICATIONS

The present application claims priority from Japanese Patent Application No. 2019-056864 filed on Mar. 25, 2019, the entire contents of which are hereby incorporated by reference.

BACKGROUND

The present disclosure relates to a control apparatus for a vehicle.

Various techniques for controlling a vehicle on the basis of the frictional state of the road surface have been proposed. For example, Japanese Unexamined Patent Application Publication No. 2002-002472 proposes a technique for estimating the friction coefficient or the condition of the road surface on which the vehicle is traveling and performing feedback control of the traveling state of the vehicle by using the estimated friction coefficient or the condition of the road surface. The technique enhances the safety of the vehicle.

SUMMARY

An aspect of technology provides a control apparatus for a vehicle. The apparatus includes tire-force sensors, a tire-force estimator, a turning-state detector, and a warning unit. The tire-force sensors are provided on respective wheels of the vehicle. The tire-force estimator is configured to estimate tire forces of the respective wheels on the basis of sensor signals outputted from the respective tire-force sensors. The turning-state detector is configured to detect a turning state of the vehicle. The warning unit is configured to generate a warning in a mode that differs depending on the turning state when at least one of the wheels is estimated to be in a limit state on the basis of the estimated tire forces.

An aspect of technology provides a control apparatus for a vehicle. The apparatus includes tire-force sensors and circuitry. The tire-force sensors are provided on respective wheels of the vehicle. The circuitry is configured to estimate tire forces of the respective wheels on the basis of sensor signals outputted from the respective tire-force sensors, detect a turning state of the vehicle, and generate a warning in a mode that differs depending on the turning state when at least one of the wheels is estimated to be in a limit state on the basis of the estimated tire forces.

An aspect of technology provides a control method for a vehicle. The method includes estimating tire forces of respective wheels on the basis of sensor signals outputted from respective tire-force sensors respectively provided on the wheels, detecting a turning state of the vehicle, and generating a warning in a mode that differs depending on the turning state when at least one of the wheels is estimated to be in a limit state on the basis of the estimated tire forces.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

A tire of a vehicle in a traveling state may possibly slip when the force generated at the tire exceeds a limit. The force generated at the tire may also be referred to as "tire force" in the description below. When the tire force exceeds a limit, the vehicle behavior may not coincide with the intention of the driver. This may possibly cause the driver to develop a feeling of strangeness and a sense of danger. Unlike the driver, an occupant may not be able to readily grasp the situation.

For example, when the vehicle slips sideways and collides, the driver may grasp the situation and be prepared for the collision. In contrast, the occupant may not be able to readily grasp the situation before the collision of the vehicle and unable to prepare for the collision.

It is desirable to provide a control apparatus for a vehicle that enables the occupant of the vehicle to promptly grasp the situation when a wheel slips.

Configuration Example of Vehicle

Figure 1:
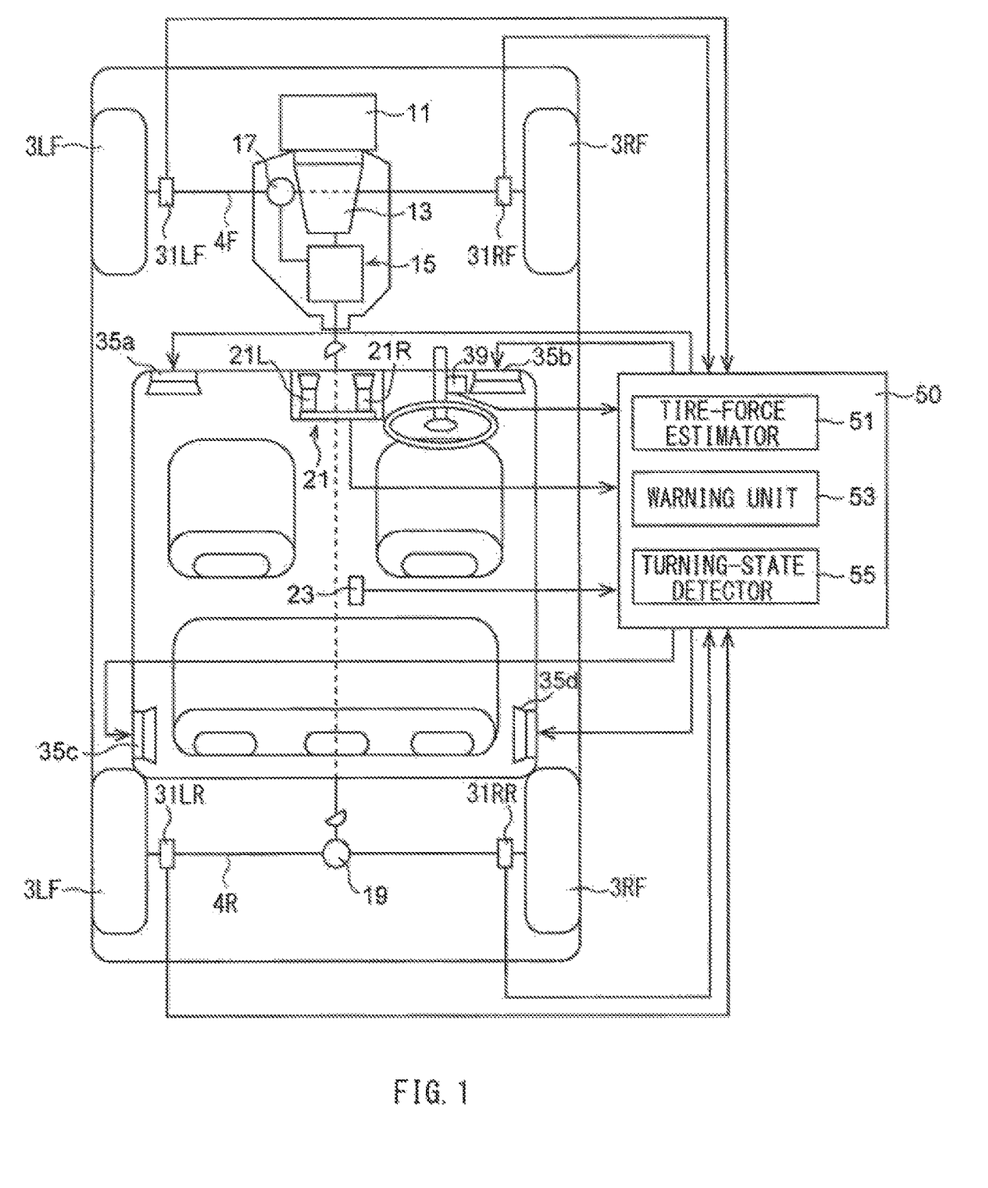
FIG. 1 illustrates a configuration example of a vehicle equipped with a control apparatus according to one example embodiment of the technology.

The configuration of a vehicle 1 according to an embodiment will now be described with reference to FIG. 1. FIG. 1 illustrates a configuration example of the vehicle 1 according to an embodiment.

The vehicle 1 illustrated in FIG. 1 may be a four-wheel-drive vehicle having four driven wheels 3. The four wheels 3 may consist of a left front wheel 3LF, a right front wheel 3RF, a left rear wheel 3LR, and a right rear wheel 3RR. The vehicle 1 may include an internal combustion engine 11. The power of the internal combustion engine 11 may be transferred to the two axels 4 via an automatic transmission 13, a center differential device 15, a front differential device 17, a rear differential device 19, etc. The two axels 4 may consist of a front wheel axel 4F and a rear wheel axel 4R. The power of the internal combustion engine 11 transferred to the front wheel axel 4F and the rear wheel axel 4R may cause a drive torque to be applied to the four wheels 3. This drives the wheels 3.

In the coordinate system of the vehicle 1 illustrated in FIG. 1, the forward traveling direction of the vehicle 1 may be defined as the x-axis direction, and the left-right direction of the vehicle 1 may be defined as the y-axis direction. The vertical direction of the vehicle 1 may be defined as the z-axis direction. The acceleration direction of the vehicle 1 may be represented as a positive direction along the x axis. The rightward direction may be represented as a positive direction along the y axis. The upward direction may be represented by a positive direction along the z axis.

The axels 4 near the wheels 3 may be provided with four tire-force sensors 31. The tire-force sensors 31 may consist of tire-force sensors 31LF, 31RF, 31LR, and 31RR. The tire-force sensors 31 may each detect a tire force that acts on the corresponding wheel 3. The detected tire force may be a front-rear force component Fx, a lateral force component Fy, and a vertical force component Fz. The front-rear force component Fx may be a component of a frictional force generated at the ground contact face of a tire covering the outer circumference of the wheel 3 in a direction parallel to the central plane of the corresponding wheel 3, i.e., the x-axis or front-rear direction. The lateral force component Fy may be a component of the force in a direction orthogonal to the central plane of the wheel 3, i.e., the y-axis or lateral direction. The vertical force component Fz may be a vertical load acting in the vertical or z-axis direction. Note that the central plane of the wheel 3 may be orthogonal to the corresponding axel 4 and pass through the center of the wheel 3 in the width direction.

The tire-force sensors 31 may be appropriate sensors capable of detection of forces acting on the tires of the wheels 3. For example, the stress generated at the wheels 3 may be proportional to the forces acting on the tires of the wheels 3. Thus, the tire-force sensors 31 may be capable of detecting the stress generated in the x-, y-, and z-axis directions of the wheels 3. The stress generated in the x-, y-, and z-axis directions respectively correspond to the front-rear force component Fx, the lateral force component Fy, and the vertical force component Fz. In this embodiment, the detected values of the front-rear force component Fx and the lateral force component Fy may be used, for example.

The tire-force sensors 31 may each have a configuration described in, for example, Japanese Unexamined Patent Application Publication No. H04-331336 and No. H10-318862, and Japanese Patent No. 4277799.

In addition to the tire-force sensors 31, a state quantity sensor 23 and a steering angle sensor 39 may also be disposed in the vehicle 1. The state quantity sensor 23 may detect a vehicle state quantity. The vehicle state quantity may be data on the state of the vehicle 1, such as velocity V, lateral acceleration ay, and yaw acceleration ω. The steering angle sensor 39 may detect an operational state quantity. The operational state quantity may be data on the operational state of the driver, such as a steering angle θ. The state quantity sensor 23 may include a known velocity sensor, a known lateral accelerometer, or a known yaw accelerometer, etc. Alternatively, the state quantity sensor 23 may include at least one sensor that comprehensively detects the various quantities.

The vehicle 1 may include an image capturing device 21 that captures images of the front view from the vehicle 1. The image capturing device 21 may include two cameras 21L and 21R, and a signal processing circuit (not illustrated) that processes the image data acquired by the cameras 21L and 21R and generates output data. The vehicle 1 may further include, for example, at least one sensor that detects information on the surroundings of the vehicle 1. Examples of such a sensor may include an ultrasonic sensor, a laser sensor, and an image capturing device.

The detection signals from the tire-force sensors 31, the state quantity sensor 23, the steering angle sensor 39, the image capturing device 21, etc., may be received by an electronic control unit 50. The electronic control unit 50 may be coupled to other electronic control units (not illustrated), such as an engine control unit, a transmission control unit, and a brake control unit. The electronic control units may be coupled to each other via a communication bus, such as a control area network (CAN). The electronic control units may each include a microcomputer. The electronic control unit 50 may receive information on the drive torque, braking torque, etc., of the vehicle from any of the other electronic control units.

For example, the engine control unit may control the internal combustion engine 11 and estimate the engine torque on the basis of the rotating speed of the internal combustion engine 11, the opening of the throttle valve, the fuel injection volume, the ignition timing, the water temperature, and the oil temperature. The transmission control unit may control the automatic transmission 13 and acquire an estimated value of the engine torque from the engine control unit. The transmission control unit may further estimate the driving torque applied to each wheel 3 or the driving force of the surface of each tire on the basis of the estimated value of the engine torque, the rotating speed of the internal combustion engine 11, the speed of the wheel 3, the position of the transmission, the engagement force of the clutch, and the slippage of the torque converter, etc. The brake control unit may detect the operated amount of the braking pedal and monitor the rotating speed of each wheel 3 to estimate the braking torque of the wheel 3 or the braking force of the tire.

The compartment of the vehicle 1 may be provided with four speakers 35. The speakers 35 may consist of speakers 35a, 35b, 35c, and 35d. The speaker 35a may be disposed in the left front area in the compartment. The speaker 35b may be disposed in the right front area in the compartment. The speaker 35c may be disposed in the left rear area in the compartment. The speaker 35d may be disposed in the right rear area in the compartment. The speakers 35 may generate warning sounds under the control of the electronic control unit 50.

The electronic control unit 50 includes a tire-force estimator 51, a warning unit 53, and a turning-state detector 55. For example, a microcomputer or a microprocessor unit may constitute a portion of or the entire electronic control unit 50. Alternatively, updatable firmware or the like may constitute a portion of or the entire electronic control unit 50. Alternatively, a program module executed under an instruction from a central processing unit (CPU) or the like may constitute a portion of or the entire electronic control unit 50.

The electronic control unit 50 may further include a memory device that stores computer programs executed by a microcomputer or the like, various parameters used in arithmetic processing, and information on the result of the processing, etc. The memory device may be a storage element, such as a random-access memory (RAM) or read only memory (ROM), or a storage device, such as a compact disk-read only memory (CD-ROM) or a hard disk drive (HDD).

In the example, the tire-force estimator 51, the warning unit 53, and the turning-state detector 55 may be realized by executing computer programs by a microcomputer or the like. The tire-force estimator 51 estimates the tire forces of the wheels 3 on the basis of the sensor signals from the tire-force sensors 31. The turning-state detector 55 may detect the turning state of the vehicle 1 on the basis of the detection signals from the image capturing device 21, the state quantity sensor 23, the steering angle sensor 39, etc.

The warning unit 53 determines whether the wheels 3 are in a limit state on the basis of the estimated tire forces. The warning unit 53 also executes a process of generating a warning in a mode that differs depending on the turning state of the vehicle 1 when any of the wheels 3 is estimated to be in a limit state. Here, the term "limit state" of the wheel 3 may refer to a state in which the wheel 3 is in a domain of possible slipping.

Figure 2:
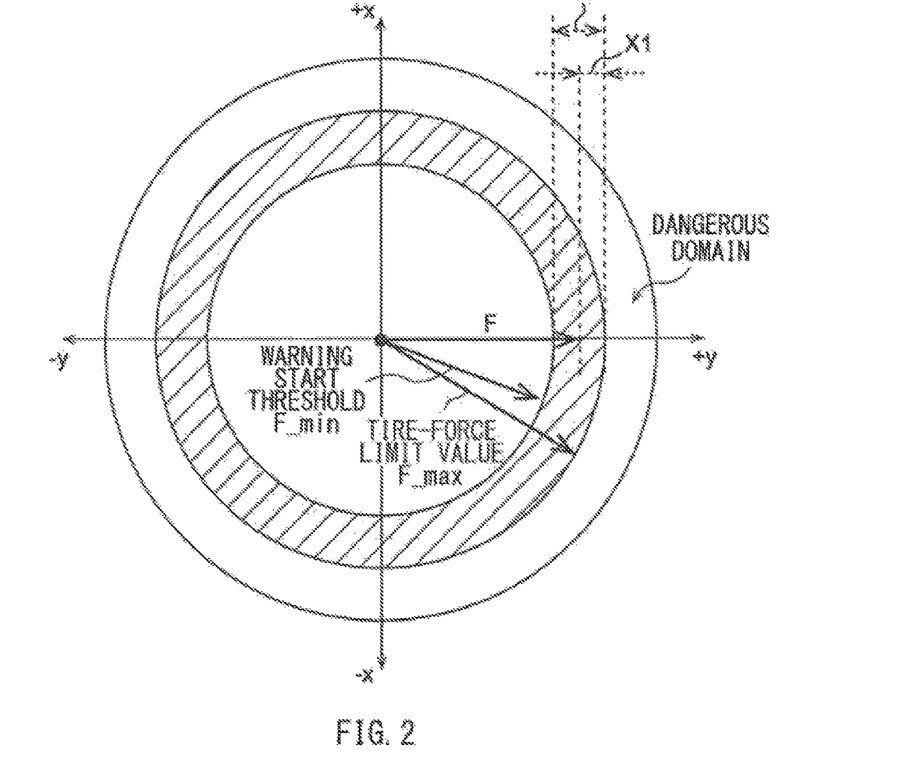
FIG. 2 is a diagram illustrating a limit state of a wheel.

FIG. 2 illustrates a limit state of a wheel 3 using a friction circle. A tire force F may be generated at each of the wheels 3 while the vehicle 1 is traveling. A positive front-rear force component Fx may be generated during acceleration of the vehicle 1. A negative front-rear force component Fx may be generated during braking of the vehicle 1. A positive or negative lateral force component Fy, as well as the front-rear force component Fx, may be generated during turning of the vehicle 1. The combined force of the front-rear force component Fx and the lateral force component Fy acting on each wheel 3 may be defined as the tire force F. There is a possibility of tire slipping in a dangerous domain in which the tire force F exceeds a tire-force limit value F_max.

The warning unit 53 of the electronic control unit 50 according to the embodiment may execute a warning process of issuing a warning to an occupant of the vehicle 1 in a mode that differs depending on the turning state of the vehicle 1 when the tire force F generated at any one of the wheels 3 exceeds a warning start threshold F_min. For example, the warning unit 53 may select at least one of the speakers 35 disposed in the front, rear, left, and right areas in the compartment in accordance with the turning state of the vehicle 1 and cause the selected at least one speaker 35 to generate warning sounds. In this way, the warning unit 53 may change the direction of the warning sounds audible to the occupant so as to inform the occupant about the predicted collision site.

The frictional force that is generated between the tire and the road surface in a traveling state may vary depending on the condition of the road surface. Thus, the tire-force limit value F_max may be established on the basis of the friction coefficient μ of the road surface corresponding to the condition of the road surface. The friction coefficient μ of the road surface may be a predetermined value. Alternatively, the friction coefficient μ may be a value established in accordance with the condition of the road surface estimated on the basis of the detection signals generated by the image capturing device 21 or the state quantity sensor 23, for example.

For example, the warning unit 53 may determine whether the road on which the vehicle 1 is traveling (hereinafter simply referred to as traveling road) is a paved road or an unpaved road, or whether the road is wet due to rain or frozen due to snow, through a detection signal from the image capturing device 21. The warning unit 53 may also determine the undulations of the road surface through a detection signal from the state quantity sensor 23. The warning unit 53 may also determine whether the traveling road is frozen through a detection signal from a road-surface temperature sensor. The warning unit 53 may also estimate the surface condition of the traveling road on the basis of the detection signals transmitted from the various sensors and the signals transmitted from in-vehicle devices and external devices, to determine the friction coefficient μ of the road surface.

Figure 3:
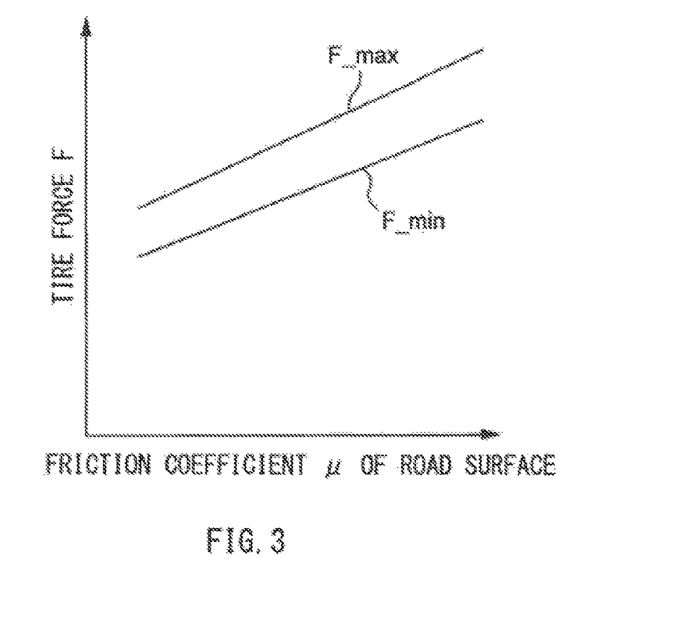
FIG. 3 is a graph illustrating the relation among a friction coefficient of the road surface, a warning start threshold, and a tire-force limit value.

FIG. 3 illustrates the relation among the friction coefficient μ of the road surface, the warning start threshold F_min, and the tire-force limit value F_max. The tire-force limit value F_max and the friction coefficient μ of the road surface may have a proportional relation. For example, the tire-force limit value F_max may be determined by multiplying the friction coefficient μ of the road surface with a predetermined factor. Likewise, the warning start threshold F_min and the friction coefficient μ of the road surface may have a proportional relation. For example, the warning start threshold F_min may be determined by multiplying the tire-force limit value F_max with a predetermined factor or value, such as 0.9.

The warning unit 53 may vary at least one of the volume or intervals of the generated warning sounds as the tire force F generated at any of the wheels 3 approaches the tire-force limit value F_max. For example, the warning unit 53 may increase the volume or shorten the intervals of the generated warning sounds as the tire force F generated at the wheels 3 approaches the tire-force limit value F_max.

In one example, the warning unit 53 may increase the volume and shorten the intervals of the warning sounds as the difference (X−X1) increases, where the difference (X−X1) is determined by subtracting the difference X1 between the tire-force limit value F_max and the tire force F from the difference X between the tire-force limit value F_max and the warning start threshold F_min. In this way, it is possible to appropriately control the volume and the intervals of the warning sounds even when the tire-force limit value F_max and the warning start threshold F_min vary due to a variation in the friction coefficient μ of the road surface.

In one embodiment of the technology, the four tire-force sensors 31 may serve as "tire-force sensors." In one embodiment of the technology, the tire-force estimator 51 may serve as a "tire force estimator." In one embodiment of the technology, the turning-state detector 55 may serve as a "turning-state detector." In one embodiment of the technology, the warning unit 53 may serve as a "warning unit."

Operation Example of Control Apparatus

Figure 4:
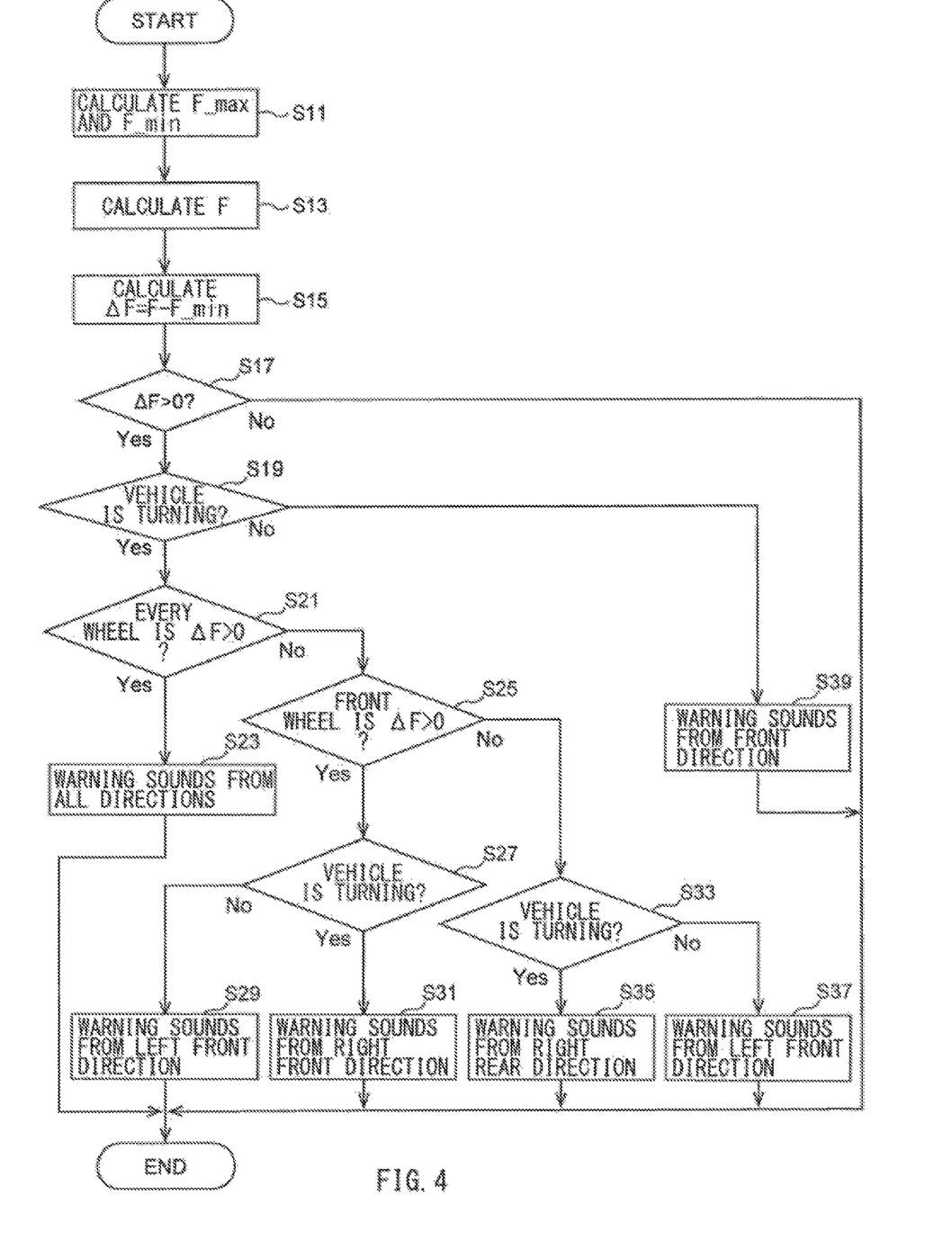
FIG. 4 is a flowchart illustrating a control process executed by the control apparatus for the vehicle according to one example embodiment.

An operation example of the electronic control unit 50 will now be described. FIG. 4 is a flowchart illustrating a control process executed by the electronic control unit 50.

The warning unit 53 of the electronic control unit 50 may calculate the tire-force limit value F_max and the warning start threshold F_min (Step S11). For example, the warning unit 53 may determine the friction coefficient μ of the surface of the traveling road on the basis of a detection signal from the image capturing device 21, a detection signal from the state quantity sensor 23, and other information that enables estimation of the condition of the road surface. The warning unit 53 may then calculate the tire-force limit value F_max and the warning start threshold F_min by multiplying the friction coefficient μ of the road surface with predetermined factors.

The tire-force estimator 51 of the electronic control unit 50 may calculate the tire forces F generated at the tires of the wheels 3 on the basis of the detection signals from the tire-force sensors 31 of the wheels 3 (Step S13). As described above, the tire force F generated at each wheel 3 may be calculated to be a combined force of the front-rear force component Fx and the lateral force component Fy.

The warning unit 53 then may calculate the difference ΔF between the calculated tire force F and the warning start threshold F_min for each wheel 3 (Step S15). The warning unit 53 then may determine whether the calculated difference ΔF is a positive value (Step S17). In Step S17, it may be determined whether the tire force F of each wheel 3 has reached the warning start threshold F_min. If the difference ΔF is not a positive value (Step S17: No), the electronic control unit 50 may cause the main routine to end and the procedure to return to Step S11.

If the difference ΔF is a positive value (Step S17: Yes), the warning unit 53 may determine whether the vehicle 1 is turning (Step S19). Whether the vehicle 1 is turning may be determined on the basis of the result detected by the turning-state detector 55. For example, the turning-state detector 55 may detect the turning state of the vehicle 1 on the basis of at least one information item among the lateral acceleration ay or the yaw acceleration ω of the vehicle 1 detected by the state quantity sensor 23 and the steering angle of the steering wheel detected by the steering angle sensor 39. Alternatively, the turning state of the vehicle 1 may be detected using a turning-angle sensor disposed on a turning wheel.

If the vehicle 1 is not turning, i.e., if the vehicle 1 is traveling straight (Step S19: No), the warning unit 53 may generate warning sounds at the front left speaker 35*a* and the front right speaker 35*b* (Step S39). If the tire force F of at least one of the wheels 3 of the vehicle 1 traveling straight corresponds to a limit state, the vehicle 1 may become uncontrollable and be subjected to a front collision. Thus, the warning unit 53 may generate warning sounds at the left front speaker 35*a* and the right front speaker 35*b* to enable the occupant of the vehicle 1 to preliminarily sense the possibility of a front collision of the vehicle 1.

If the vehicle 1 is turning (Step S19: Yes), the warning unit 53 may determine whether the tire force F exceeds the warning start threshold F_min in every wheel 3 (Step S21). If the tire force F exceeds the warning start threshold F_min in every wheel 3 (Step S21: Yes), the warning unit 53 may generate warning sounds at every speaker 35 (Step S23). When the tire force F of every wheel 3 corresponds to a limit state during turning of the vehicle 1, the vehicle 1 may become uncontrollable, which makes it difficult to predict the behavior of the vehicle 1. Thus, the warning unit 53 may generate warning sounds at every speaker 35 to enable the occupant of the vehicle to preliminarily sense the possibility of a collision of the vehicle 1.

If the tire force F exceeds the warning start threshold F_min in not every wheel 3 (Step S21: No), the warning unit 53 may determine whether the tire force F exceeds the warning start threshold F_min in a front wheel 3 (Step S25). If the tire force F exceeds the warning start threshold F_min in the front wheel 3 (Step S25: Yes), the warning unit 53 may determine whether the vehicle 1 is turning to the left (Step S27).

If the vehicle 1 is turning to the left (Step S27: Yes), the warning unit 53 may generate warning sounds at the front right speaker 35*b* (Step S31). When the front wheel 3LF or 3RF is in a limit state while the vehicle 1 is turning to the left, the vehicle 1 may possibly enter an understeered state and be subjected to a front right collision. Thus, the warning unit 53 may generate warning sounds at the right front speaker 35*b* to enable the occupant of the vehicle 1 to preliminarily sense the possibility of a front right collision of the vehicle 1.

If the vehicle 1 is not turning to the left, i.e., if the vehicle 1 is turning to the right (Step S27: No), the warning unit 53 may generate warning sounds at the left front speaker 35*a* (Step S29). When the front wheel 3LF or 3RF is in a limit state while the vehicle 1 is turning to the right, the vehicle 1 may possibly enter an understeered state and be subjected to a front left collision. Thus, the warning unit 53 may generate warning sounds at the left front speaker 35*a* to enable the occupant of the vehicle 1 to preliminarily sense the possibility of a front left collision of the vehicle 1.

In Step S25, if the tire force F exceeds the warning start threshold F_min in a wheel other than the front wheels 3 (Step S25: No), the warning unit 53 may determine whether the vehicle 1 is turning to the left (Step S33).

If the vehicle 1 is turning to the left (Step S33: Yes), the warning unit 53 may generate warning sounds at the right rear speaker 35*d* (Step S35). When the rear wheel 3LR or 3RR is in a limit state while the vehicle 1 is turning to the left, the vehicle 1 may possibly enter an oversteered state and be subjected to a right rear collision. Thus, the warning unit 53 may generate warning sounds at the right rear speaker 35*d* to enable the occupant of the vehicle 1 to preliminarily sense the possibility of a right rear collision of the vehicle 1.

If the vehicle 1 is not turning to the left, i.e., if the vehicle 1 is turning to the right (Step S33: No), the warning unit 53 may generate warning sounds at the left rear speaker 35*a* (Step S37). When the rear wheel 3LR or 3RR is in a limit state while the vehicle 1 is turning to the right, the vehicle 1 may possibly enter an oversteered state and be subjected to a left rear collision. Thus, the warning unit 53 may generate warning sounds at the left rear speaker 35*c* to enable the occupant of the vehicle 1 to preliminarily sense the possibility of a left rear collision of the vehicle 1.

In this way, the control apparatus for the vehicle according to the example may enable the occupant of the vehicle to promptly grasp the situation when a wheel slips. For example, when the tire force F of any one of the wheels 3 exceeds the warning start threshold F_min, the speaker(s) 35 selected in accordance with the turning state of the vehicle 1 may generate warning sounds. This enables the occupant of the vehicle 1 to immediately perceive, through auditory perception, the presence of a wheel 3 that is approaching a slipping limit, the possibility of a collision, and the predicted collision site, on the basis of the audible direction of the warning sounds. Thus, it is possible to enable the occupant to preliminarily sense the presence of a wheel 3 that is approaching a slipping limit, the possibility of a collision, and the predicted collision site. Consequently, it is possible to alleviate the damage caused by an actual collision, if occurs.

Note that in the embodiments described above, when the tire force F of any one of the wheels 3 exceeds the warning start threshold F_min, the direction of the warning sounds audible to the occupant may differ depending on the turning state of the vehicle 1. Other than or besides the audible direction of the warning sounds, the type of the warning sounds may be changed. For example, the pitch or the tone of the warning sounds may be varied in accordance with the turning state of the vehicle 1. Thus, the variation in the pitch or the tone of the warning sounds may also enable the occupant to immediately perceive, through auditory perception, the presence of a wheel 3 that is approaching the slipping limit, the possibility of a collision, and the predicted collision site.

In the embodiments described above, after the position of the wheel 3 generating a tire force F corresponding to a limit state is determined (Step S25) and the turning state of the vehicle 1 is determined (Step S27), an obstacle residing in the forward traveling path of the vehicle 1 may be detected on the basis of the result detected by the image capturing device 21, and then one or more speakers 35 may be selected to generate warning sounds. In other words, the warning unit 53 may determine the predicted collision site of the vehicle on the basis of the turning state and information on the surroundings of the vehicle, and generate warning sounds audible to the occupant from the direction of the predicted collision site. In this way, the collision site of the vehicle 1 may be predicted by using the information on the presence of an obstacle, as well as, the determined results of the turning direction and the understeered or oversteered state of the vehicle 1, and the predicted collision site may be informed to the occupant of the vehicle 1.

Application Example

The control apparatus for the vehicle according to the above-described embodiment may be modified in many ways. For example, the warning unit 53 may vary the volume or intervals of the generated warning sounds in accordance with the magnitude of the tire force F. For example, the warning unit 53 may increase the volume and shorten the intervals of the generated warning sounds as the difference X–X1 increases, where the difference X–X1 is determined by subtracting the difference X1 between the tire-force limit value F_max and the tire force F from the difference X between the tire-force limit value F_max and the warning start threshold F_min. In this way, it is possible to appropriately control the volume and the intervals of the warning sounds even when the tire-force limit value F_max and the warning start threshold F_min vary due to a variation in the friction coefficient $\mu$ of the road surface.

Figure 5:
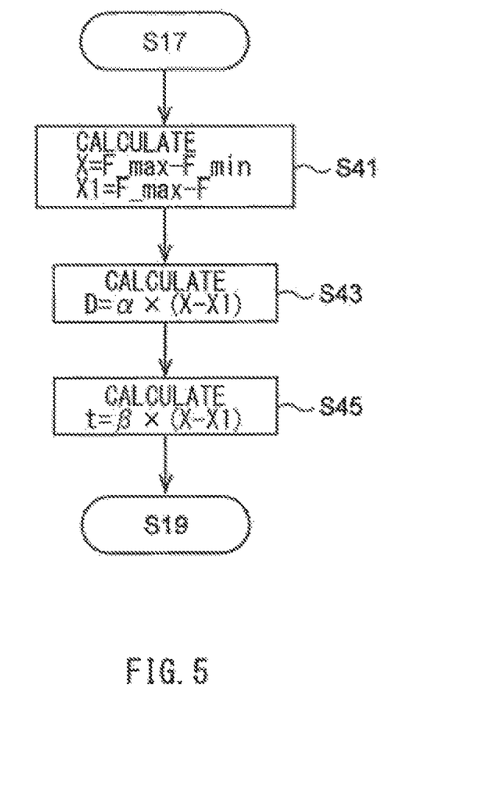
FIG. 5 is a flowchart illustrating an application example of the control process according to one example embodiment.

FIG. 5 is a flowchart illustrating an example in which the warning unit 53 increases the volume and shortens the intervals of warning sounds as the tire force F generated at the wheels 3 approach the tire-force limit value F_max. The process illustrated in the flowchart in FIG. 5 may be executed, for example, between Steps S17 and S19 in the flowchart illustrated in FIG. 4.

In Step S17, if the difference $\Delta F$ between the tire force F and the warning start threshold F_min is determined to be a positive value (Step S17: Yes), the warning unit 53 may calculate the difference X between the tire-force limit value F_max and the warning start threshold F_min and the difference X1 between the tire-force limit value F_max and the tire force F (Step S41).

The warning unit 53 then may calculate the volume D of the warning sounds by multiplying the difference between the differences X and X1 with a predetermined factor $\alpha$ (Step S43). In Step S43, the volume D may increase as the tire force F approaches the tire-force limit value F_max. By using the difference between the differences X and X1, it is possible to appropriately control the volume D even when the tire-force limit value F_max varies due to the condition of the surface of the traveling road.

The warning unit 53 then may calculate the intervals t of the generated warning sounds by multiplying the difference X with a predetermined factor $\beta$ (Step S45). For example, in Step S45, the intervals t of the generated warning sounds may be shorted as the tire force F approaches the tire-force limit value F_max. By using the difference between the differences X and X1, the intervals t may be appropriately established even when the tire-force limit value F_max varies due to the condition of the surface of the traveling road.

Note that the intervals t of the warning sounds may be varied by varying the temporal length of the warning sounds intermittently generated or the temporal length of the silent periods between the intermittently generated warning sounds. Alternatively, the temporal length of the warning sounds and the temporal length of the silent periods between the warning sounds may both be varied.

The warning unit 53 may generate warning sounds at the calculated volumes D and the intervals tin the warning sound generating procedures in Steps S23, S29, S31, S35, S37, and S39. In this way, it is possible to enable the occupant of the vehicle 1 to sense the likelihood of the slipping of the vehicle 1 and prepare for a collision. Thus, it is possible to alleviate the damage caused by an actual collision of the vehicle 1, if occurs.

One or more of the tire-force estimator 51, the warning unit 53, and the turning-state detector 55 in the electronic control unit 50 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the tire-force estimator 51, the warning unit 53, and the turning-state detector 55. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the tire-force estimator 51, the warning unit 53, and the turning-state detector 55 in the electronic control unit 50 illustrated in FIG. 1.

Some embodiments of the technology have been described in detail with reference to the accompanying drawings. Note that the description above is not to be construed as limiting to the technology. Although some example configurations, example processing and modification examples according to an embodiment of the technology are described hereinabove, the foregoing embodiments are mere examples and are not intended to limit the scope of the technology. It should be also appreciated that various omissions, replacements, and modifications may be made in the foregoing embodiments described herein, without departing from the scope of the spirit of the technology. The technology is intended to include such modifications and alterations in so far as they fall within the scope of the appended claims or the equivalents thereof.

The invention claimed is:

1. A control apparatus for a vehicle, the apparatus comprising:
   tire-force sensors provided on respective wheels of the vehicle;
   a tire-force estimator configured to estimate tire forces of the respective wheels on a basis of sensor signals outputted from the respective tire-force sensors;
   a turning-state detector configured to detect a turning state of the vehicle; and
   a warning unit configured to generate a warning in a mode that differs depending on the turning state when at least one of the wheels is estimated to be in a limit state on a basis of the estimated tire forces.

2. The control apparatus according to claim 1, wherein the warning unit is configured to, when a traveling state of the vehicle is the turning state, generate the warning in a mode that differs depending on a position of the at least one of the wheels estimated to be in the limit state.

3. The control apparatus according to claim 1, wherein, the warning comprises sound, and
the warning unit is configured to change an audible direction of the sound to an occupant or a type of the sound in accordance with the turning state.

4. The control apparatus according to claim 2, wherein, the warning comprises sound, and
the warning unit is configured to change an audible direction of the sound to an occupant or a type of the sound in accordance with the turning state.

5. The control apparatus according to claim 1, wherein, the warning comprises sound, and
the warning unit is configured to vary volume or intervals of the sound in accordance with the tire forces.

6. The control apparatus according to claim 2, wherein, the warning comprises sound, and
the warning unit is configured to vary volume or intervals of the sound in accordance with the tire forces.

7. The control apparatus according to claim 1, wherein, the warning comprises sound, and
the warning unit is configured to predict a collision site of the vehicle on a basis of the turning state and information on surroundings of the vehicle, and generate the warning audible to an occupant in a direction of the predicted collision site.

8. The control apparatus according to claim 2, wherein, the warning comprises sound, and
the warning unit is configured to vary volume or intervals of the sound in accordance with the tire forces.

9. A control apparatus for a vehicle, the apparatus comprising:
tire-force sensors provided on respective wheels of the vehicle; and
circuitry configured to
estimate tire forces of the respective wheels on a basis of sensor signals outputted from the respective tire-force sensors,
detect a turning state of the vehicle, and
generate a warning in a mode that differs depending on the turning state when at least one of the wheels is estimated to be in a limit state on a basis of the estimated tire forces.

10. A control method for a vehicle, the method comprising:
estimating tire forces of respective wheels on a basis of sensor signals outputted from respective tire-force sensors respectively provided on the wheels;
detecting a turning state of the vehicle; and
generating a warning in a mode that differs depending on the turning state when at least one of the wheels is estimated to be in a limit state on a basis of the estimated tire forces.

* * * * *